United States Patent
Tsaur et al.

(10) Patent No.: US 7,890,714 B1
(45) Date of Patent: Feb. 15, 2011

(54) REDIRECTION OF AN ONGOING BACKUP

(75) Inventors: Ynn-Pyng "Anker" Tsaur, Oviedo, FL (US); Kien Anh Hua, Longwood, FL (US); Hao Cheng, Orlando, FL (US); Yao Hua Ho, Kissimmee, FL (US); Danzhou Liu, Orlando, FL (US); Fei Xie, Orlando, FL (US)

(73) Assignee: Symantec Operating Corporation, Mountain View, CA (US)

( * ) Notice: Subject to any disclaimer, the term of this patent is extended or adjusted under 35 U.S.C. 154(b) by 510 days.

(21) Appl. No.: 11/864,389

(22) Filed: Sep. 28, 2007

(51) Int. Cl.
*G06F 12/00* (2006.01)
(52) U.S. Cl. ..................... 711/162
(58) Field of Classification Search ............. 711/162
See application file for complete search history.

(56) References Cited

U.S. PATENT DOCUMENTS

| | | | |
|---|---|---|---|
| 6,647,415 B1 | 11/2003 | Olarig et al. | 709/224 |
| 2004/0083245 A1* | 4/2004 | Beeler, Jr. | 707/204 |
| 2008/0034004 A1* | 2/2008 | Cisler et al. | 707/200 |

OTHER PUBLICATIONS

RevStor, LLC., "Installing and Coordinating a Wan -based Grid Storage System," May 15, 2007, www.revstor.com, pp. 1-2.
Russell Kay, "QuickStudy: Grid Storage," Computerworld Storage, Feb. 1, 2008, http://www.computerworld.com/action/article.do?command=printArticleBasic&articleID=9, pp. 1-3.

* cited by examiner

*Primary Examiner*—Mardochee Chery
(74) *Attorney, Agent, or Firm*—Campbell Stephenson LLP (57) ABSTRACT

One method of redirecting an in-process backup operation to a new storage device involves receiving a request to perform a backup from a backup application. In response to reception of the request, the method causes backup information generated by the backup application to be stored on a first storage device. The first storage device is monitored in order to detect how much free space is available. If the amount of space available on the first storage device drops below a threshold amount prior to completion of the backup, the backup is redirected by causing any subsequent backup information generated by the backup application to be stored on a second storage device. Metadata associated with the backup identifies that information associated with the backup is stored on both the first storage device and the second storage device.

20 Claims, 6 Drawing Sheets

REDIRECTION OF AN ONGOING BACKUP

FIELD OF THE INVENTION

This invention relates to data storage and, more particular, to performing backups and recoveries of stored data.

BACKGROUND

In the most conventional backup systems, the amount of information that will be written by a backup operation is unknown at the time that the backup operation begins. Accordingly, it is possible to select a destination storage device for the backup that ultimately does not have enough free storage space to store the entire backup. For example, assume the total amount of backup information is 120 GB and the free storage space of the selected storage device is only 100 GB. When the backup operation attempts to transfer information in excess of 100 GB to the selected storage device, the selected storage device will not be able to store the additional information. This in turn causes the backup operation to fail due to the storage overflow.

A storage overflow significantly delays completion of the backup, since a new backup operation targeting a different storage device will need to be started, and any information that was already written to backup by the failed backup operation will need to be transferred again to the new storage device. As this example shows, it is desirable to be able to increase backup efficiency in situations in which the originally-selected target storage device is not able to store all of the backup information.

SUMMARY OF THE INVENTION

Various embodiments of systems and methods for redirecting an in-process backup operation to a new storage device are disclosed. In one embodiment, a method involves receiving a request to perform a backup from a backup application. In response to reception of the request, backup information generated by the backup application as part of the backup is caused to be stored on a first storage device (e.g., by establishing a first connection between the backup application and the first storage device). The method then monitors the first storage device in order to detect how much available space is available for use to store the backup. If the amount of space available on the first storage device subsequently drops below a threshold amount prior to completion of the backup, the method redirects the backup by causing any subsequent backup information generated by the backup application to be stored on a second storage device (e.g., by establishing a second connection between the backup application and the second storage device). The subsequent backup information is stored on the second storage device prior to completion of the backup. In one embodiment, the backup is paused while the second connection is being established. The method can then generate metadata associated with the backup. The metadata identifies that information associated with the backup is stored on both the first storage device and the second storage device.

In one embodiment, the method operates in a grid storage system, and a centralized redirection module controls the establishment of connections (e.g., by selecting which storage node(s) to use when performing a particular backup) and the redirection of backups. In another embodiment, the method operates in a non-grid system, and separate media servers can be involved in establishing respective connections. One media server (or a master media server) can redirect the backup and cause the second connection to be established by communicating with a second media server.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
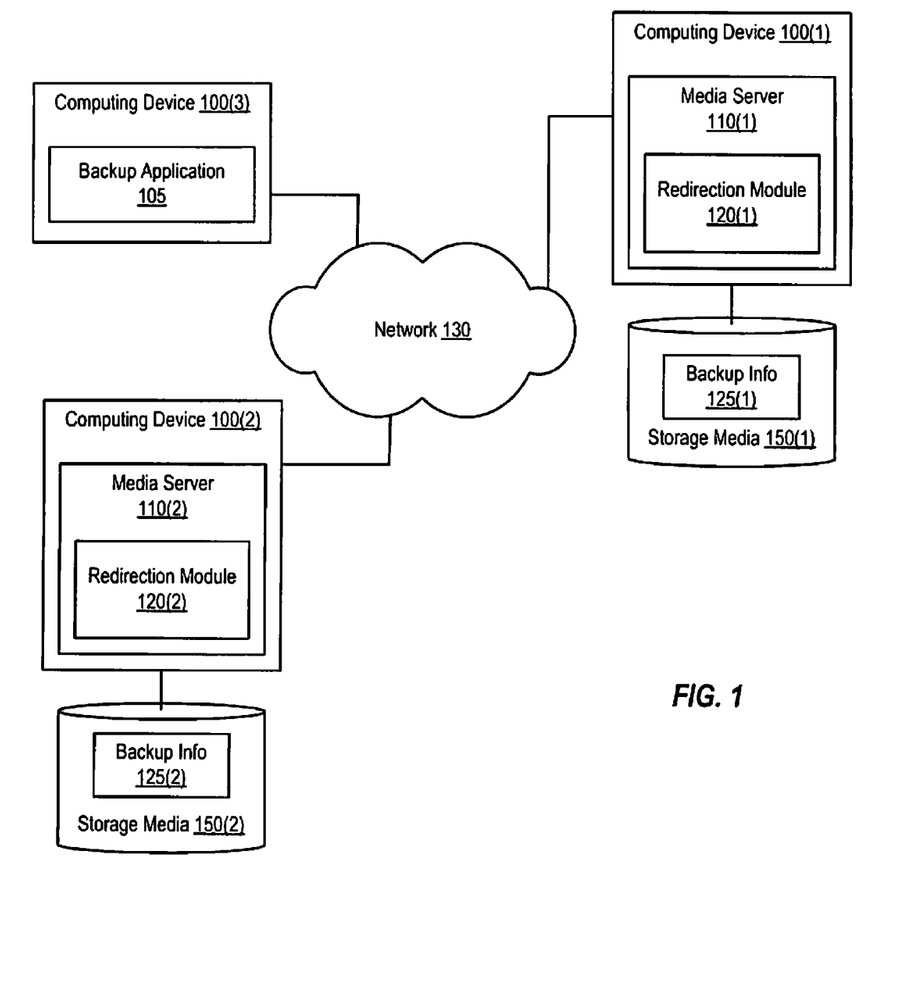
FIG. 1 is a block diagram of a system that supports the redirection of in-process backups, according to one embodiment of the present invention.

FIG. 1 is a block diagram of a system that supports the redirection of in-process backups. The system includes three computing devices 100(1), 100(2), and 100(3) that are coupled by a network 130. Computing devices 100(1), 100(2), and 100(3) can include various devices, such as personal computers, servers, laptops, cell phones, personal digital assistants, and the like. In general, computing devices 100(1), 100(2), and 100(3) are configured to execute software or otherwise provide appropriate functionality to act as a component of the backup system described herein.

Network 130 can include one or local- and/or wide-area networks. Network 130 can be implemented using various topologies, communication protocols, and physical links (e.g., wireless links, coaxial cables, and the like).

Computing device 100(1) implements media server 110(1), and computing device 100(2) similarly implements media server 110(2). Computing device 100(3) implements a backup application 105. In one embodiment, backup application 105 is Symantec Backup Exec, available from Symantec Corporation of Cupertino, Calif. In other embodiments, other types of backup applications (other than Backup Exec) can be used as backup application 105.

Computing device 100(1) is coupled to access information stored by storage media 150(1). Similarly, computing device 100(2) is coupled to access information stored by storage media 150(2). Storage media 150(1) and 150(2) can each include one or more physical storage devices (e.g., hard disks, compact discs (CDs), digital versatile discs (DVDs), and the like). In some embodiments, storage media 150(1) and/or storage media 150(2) are logical storage devices (e.g., logical volumes) that are implemented using multiple underlying physical storage devices (e.g., according to techniques such as Redundant Array of Independent Disks (RAID) that provide for mirroring, striping, or the like).

Backup application 105 is configured to interact with media server 110(1) or media server 110(2) in order to request a backup or restore. For example, backup application 105 can send a request to perform a backup to media server 110(1). In response to receiving the request, media server 110(1) can facilitate establishment of a connection between backup application 105 and storage media 150(1), allowing backup application 105 to write a copy of the information being backed up to storage media 150(1). Generally, media servers 110(1) and 110(2) are configured to receive requests to perform backups and restores from agents or clients such as backup application 105 and, in response, to manage the backups and restores by scheduling and otherwise controlling performance of the backups and restores.

Performing a backup involves creating a copy of a set of information and storing that copy (e.g., on storage media 150(1) and/or 150(2)). Performing a restore involves restoring a particular set of information (e.g., a file) from a backup of that set of information.

Media server 110(1) includes a redirection module 120(1) that is configured to redirect ongoing backups if a storage overflow occurs. Media server 110(2) includes a similar redirection module 120(2). Redirection modules 120(1) and 120(2) are configured to monitor ongoing backups and, if needed, to trigger the redirection of an ongoing backup, as described in more detail below.

Redirection module 120(1) is configured to monitor the amount of space remaining in storage media 150(1) as a backup is being performed (i.e., as a copy of the information being backed up is being written to storage device 150(1)). If the amount of free space (i.e., the space available to store the backup) drops below a threshold level, redirection module 120(1) is configured to notify media server 110(1). This in turn causes media server 110(1) to pause or otherwise inhibit the ongoing backup and to locate another media server that may be able to complete the ongoing backup. Once another media server (e.g., media server 110(2)) has been located, media server 110(1) communicates with the other media server in order to cause the backup to be completed by the other media server.

As an example, backup application 105 can request a backup from media server 110(1). Media server 110(1) can schedule the backup and, at the scheduled time, allow backup application 105 to begin writing the copy of the information being backed up to storage media 150(1). This copied information is stored, at least in part, as backup information ("info") 125(1). As the backup is being performed, redirection module 120(1) monitors the amount of space available on storage media 150(1). When the amount of space is less than a threshold amount, redirection module 120(1) communicates with media server 110(1) and/or backup application 105 in order to pause the backup, such that no additional information is written to storage media 150(1) after the backup is paused. Redirection module 120(1) then communicates information indicative of the original backup request to redirection module 120(2) of media server 110(2), which causes media server 110(2) to begin interacting with backup application 105 in order to complete the paused backup by writing the remainder of the copy of the backed-up information to storage media 150(2). This remaining information is stored as backup information 125(2).

Thus, backup information 125(1) and backup information 125(2) make up the entire set of information written by a single backup. Media servers 110(1) and 110(2) can generate metadata that associates these two sets of backup information with the backup (e.g., by identifying the date, time, original data that was copied by the backup, etc.), indicating that both sets of backup information are part of the same backup. The metadata can also identify which of several backed-up objects (e.g., files, directories, databases, and the like) are stored on each storage media. This metadata can be used when restoring information from a backup that was redirected. Each media server can generate a piece of metadata describing the portion of the backup that was handled by that particular media server, and both pieces of metadata can then be stored in a manner that associates both pieces with the same backup.

It is noted that the same backup can be redirected more than once. Thus, after being redirected to storage media 150(2), the backup can again be redirected if redirection module 120(2) detects that the amount of space available on storage media 150(2) is less than a threshold amount. A given backup can be redirected as many times as needed in order to complete the backup.

In one embodiment, media servers 110(1) and 110(2) operate as a cluster, and one media server acts as the "master" server. Alternatively, an additional server (not shown in FIG. 1) can be included in the system, and this additional server can act as the master server to media servers 110(1) and 110(2). In such embodiments, the individual media servers can be configured to notify the master server whenever a backup needs to be paused and redirected. In response to being notified that a backup needs to be paused and redirected, the master server can pause the backup and select the next media server to manage the paused backup. The master server can collect information (e.g., from redirection modules 120(1) and 120(2)) about the amount of space remaining on each media server's storage media and use that information to select the next media server. The master server can then cause another media server to establish a new connection with the backup application and un-pause the backup.

Figure 2:
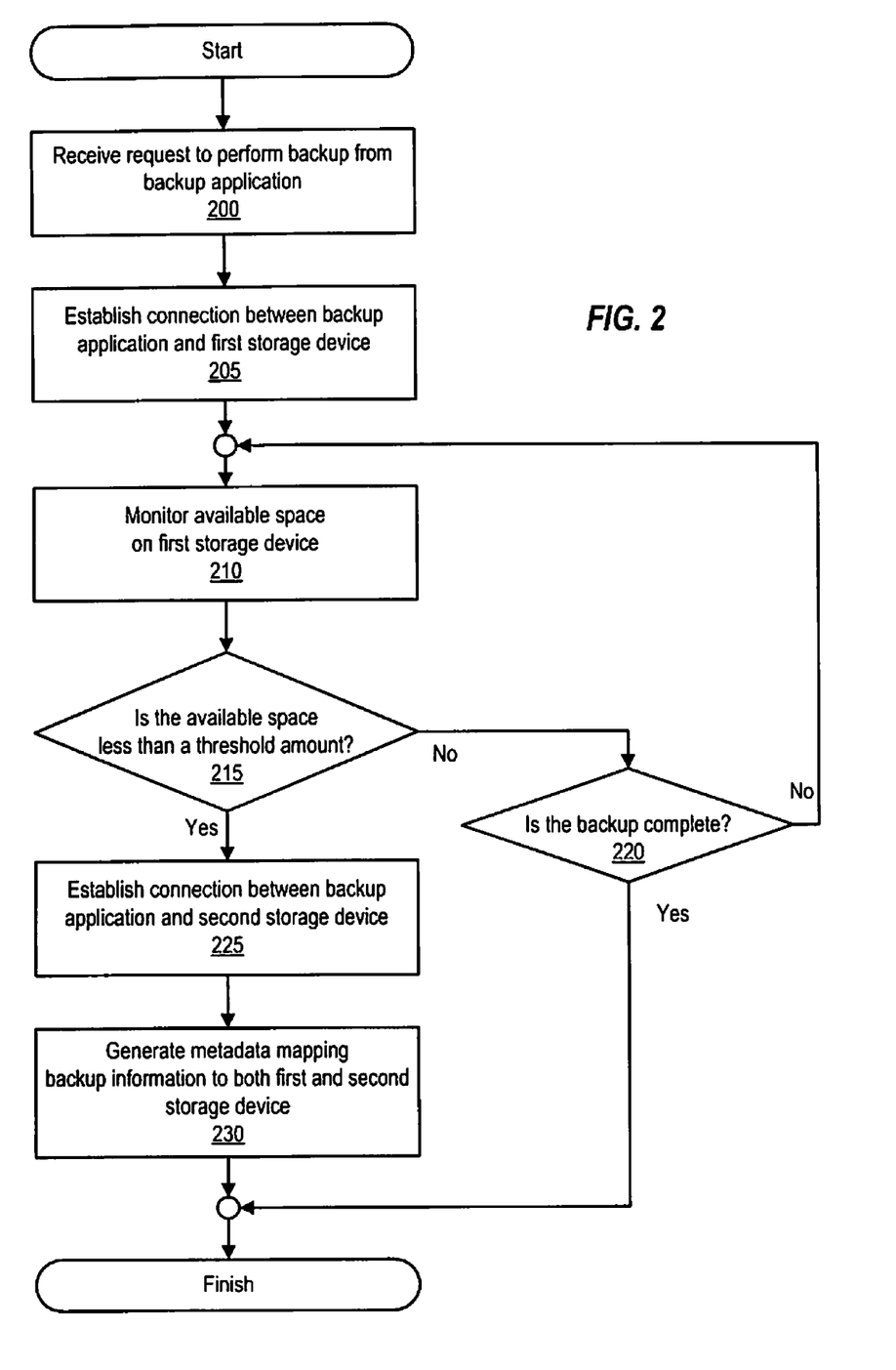
FIG. 2 is a flowchart illustrating a method of redirecting an in-process backup operation, according to one embodiment of the present invention.

FIG. 2 is a flowchart illustrating a method of redirecting an in-process backup operation. The method begins at 200, when a request to perform a backup is received from a backup application. Receiving a request to perform a backup can involve receiving (e.g., via a network) a request to begin copying information to be backed up to storage media managed by a media server. Operation 200 can be performed by an individual media server or a master server that manages multiple media servers.

At 205, a connection is established between the backup application and a first storage device. Establishing the connection involves facilitating the writing of information, which is a copy of the information being backed up by the backup, to the first storage device. Operation 205 can be performed by a media server. The first storage device can be a logical or physical device. In some embodiments, the first storage device includes a several component storage devices (e.g., the first storage device can be a storage array made up of multiple hard drives).

At 210, the amount of space available on the first storage device is monitored. Monitoring the amount of space available can involve repeatedly (e.g., at prespecified intervals) or continuously ascertaining the amount of free (i.e., unutilized) space remains on the first storage device. Operation 210 can be performed by a redirection module within a media server.

At 215, a determination is made as to whether the available space on the first storage device is less than a threshold amount. Operations 210 and 215 can be repeated until the backup completes, as indicated at 220.

If the available space monitored at 210 is less than a threshold amount, the backup is redirected by establishing a connection between the backup application and a second storage device, as shown at 225. Operation 215 can be performed by a redirection module within a media server, and operation 225 can be performed by one or more redirection modules, media servers, and/or master servers. For example, in one embodiment, operation 225 can be performed by a media server coupled to the second storage device, in response to a redirection request generated by a master server.

Establishment of the connections between the backup application and the storage devices, shown at 205 and 225, can be performed by individual media servers and/or a combination of media servers and a master server. For example, the master server can initiate the establishment of each connection by selecting a media server to initially handle the backup and then selecting another media server to handle the backup when the backup is redirected and communicating with the selected media servers. In an alternative embodiment that does not include a master server, the first media server that is initially handling the backup can initiate establishment of the second connection by communicating with the second media server.

It is noted that the establishment of a new connection, as a result of a redirection, can be performed in a manner that is not detected by the backup application itself. Thus, the redirections can be transparent to the backup application.

To avoid any loss of information, the backup may be paused as soon as the amount of space available on the first storage device is determined to be less than the threshold amount. The backup can resume (i.e., pausing of the backup can cease) as soon as the connection with the second storage device is established.

In some embodiments, there are several candidate storage devices to which the backup can be redirected. In some such embodiments, the next storage device is selected in a manner (e.g., randomly, based on a round-robin scheme, or the like) that is independent of the amount of storage space available on each candidate storage devices. In other embodiments, the next storage device is selected based upon the amount of space available on each storage device. For example, in one embodiment, the candidate storage device with the greatest amount of free space is selected as the next storage device.

The threshold indicated at 215 is a value that indicates an amount of storage space. The threshold can be specified in absolute terms (e.g., 1 Gigabyte), as a percentage (e.g., 5% free space), or in any other desired manner. In some embodiments, the same threshold is used for all storage devices; in other embodiments, different thresholds can be specified for different storage devices.

If the backup was redirected (e.g., if operation 225 was performed), metadata mapping the backup information generated by the backup to both the first and the second storage device is generated, as shown at 230. This metadata can be generated by one or more media servers (e.g., metadata relating to the portion of the backup information stored on the first storage device can be generated by a first media server and metadata relating to the portion of the backup information stored on the second storage device can be generated by a second media server). The metadata can be stored in a centralized repository (e.g., managed by the master server in a cluster of media servers) or distributed among the media servers (e.g., each media server can store metadata). If the backup was not redirected, similar metadata mapping the backup information generated by the backup to a single storage can be generated (not shown).

It is noted that redirection of the ongoing backup is transparent to the backup application that initiated the backup. In particular, redirection of the ongoing backup is done without signaling an error to the backup application, and the backup application may not receive any indicating that some of the backup information is written to a different storage device than other portions of the backup information.

While the flowchart of FIG. 2 allows for only a single redirection of an ongoing backup, it is noted that other embodiments can support multiple redirections of the same backup. Thus, operations 210 and 215 can be repeated for additional storage devices. If a backup is redirected to a storage device that does not have sufficient room to store the remaining backup information generated by the backup, that backup can thus be redirected again.

Figure 3:
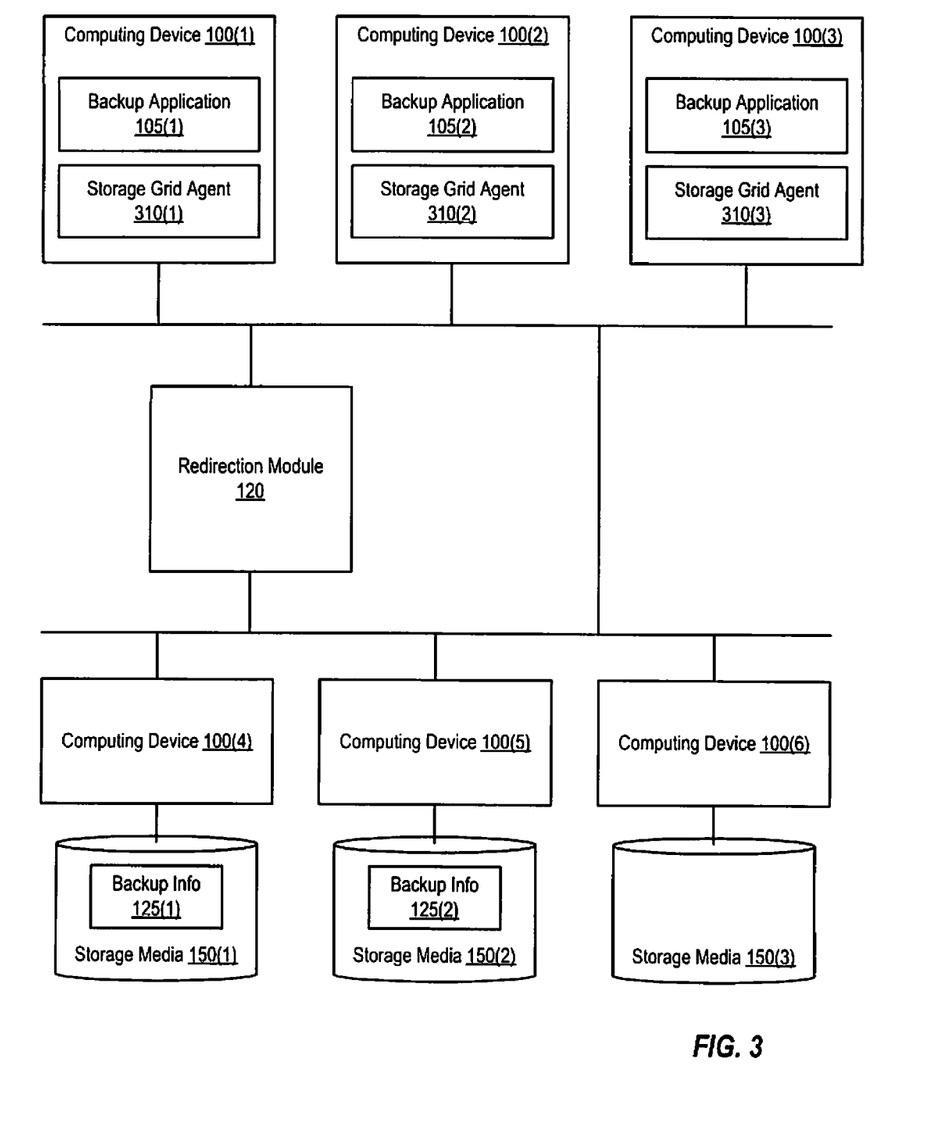
FIG. 3 is a block diagram of a storage grid that supports the redirection of in-process backups, according to one embodiment of the present invention.

FIG. 3 is a block diagram of a storage grid that supports the redirection of in-process backups. In FIG. 3, several computing devices 100(1), 100(2), 100(3), 100(4), 100(5), and 100(6) are coupled by a network. The computing devices in the storage grid can be heterogeneous, such that each computing device implements different software, includes different hardware, and/or provides different types and/or quantities of storage.

In this example, three computing devices are shown as implementing a backup application. In particular, computing device 100(1) implements backup application 105(1), computing device 100(2) implements backup application 105(2), and computing device 100(3) implements backup application 105(3). Backup applications 105(1)-105(3) can be implemented using any of a variety of backup applications, including proprietary solutions such as Symantec Backup Exec and open source solutions such as Bacula™.

Each computing device that implements a backup application also implements a storage grid agent. In particular, computing device 100(1) implements storage grid agent 310(1), computing device 100(2) implements storage grid agent 310(2), and computing device 100(3) implements storage grid agent 310(3).

Three additional computing devices 100(4), 100(5), and 100(6) are shown as providing storage to the storage grid. In particular, computing device 100(4) is coupled to storage media 150(1), computing device 100(5) is coupled to storage media 150(2), and computing device 100(6) is coupled to storage media 150(3). Each storage media 150(1)-150(3) can be used to store all or part of the information generated by a backup application as part of a backup. Additionally, each storage media can include one or more physical storage devices.

Figure 5:
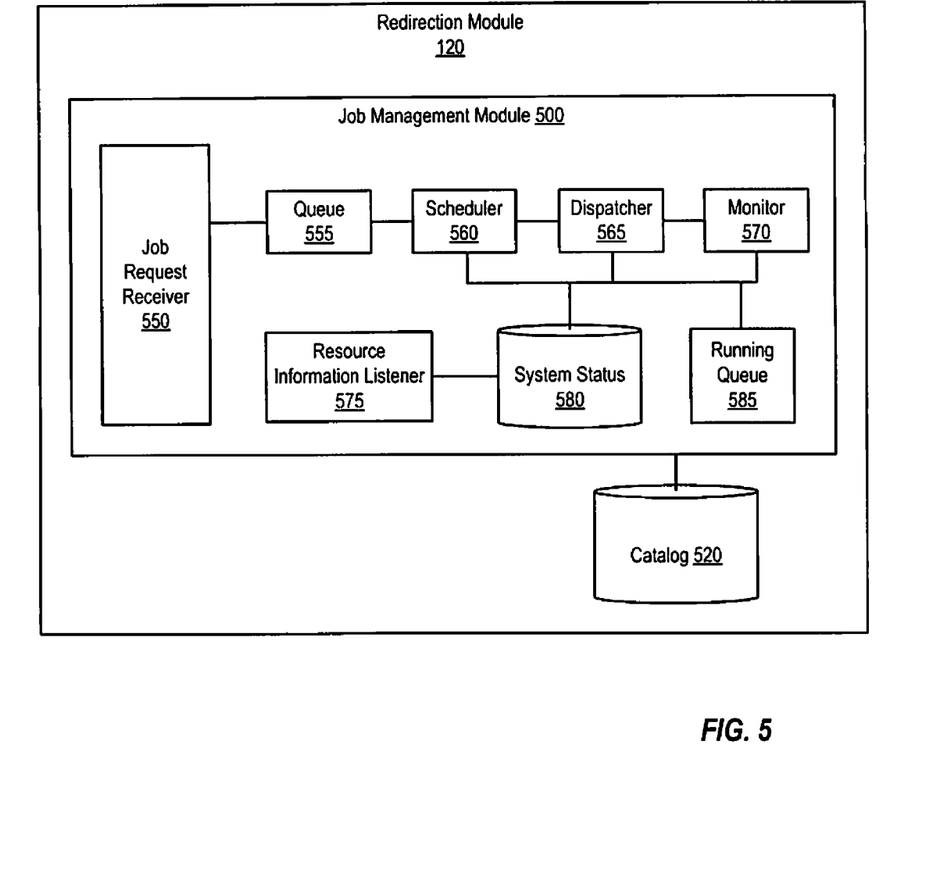
FIG. 5 is a block diagram of a redirection module for redirecting ongoing backups and managing backup-related operations in a grid storage system, according to one embodiment of the present invention.

A redirection module 120 is also coupled to the network that couples computing devices 100(1)-100(6). In some embodiments, redirection module 120 can be implemented in software that is executed on a separate computing device (not shown). Alternatively, redirection module 120 can be implemented on one or more of computing devices 100(1)-100(6). Like the redirection module of FIG. 1, redirection module 120 of FIG. 3 is configured to monitor the space available on storage media that is being written to as part of an ongoing backup and, if needed, to redirect that ongoing backup to another storage media. Additionally, redirection module 120 of FIG. 3 can include storage-grid-specific components, such as a job manager, scheduler, and the like, as shown in FIG. 5. In general, in a storage grid environment, redirection module 120 can include functionality to select a node and schedule a backup that writes backup information to the selected node.

In one embodiment, the storage grid-specific components (e.g., storage grid agents 310(1)-310(3), redirection module 120, and storage grid-specific monitoring software on each storage node (e.g., computing devices 100(4)-100(6)) can be implemented using the Globus™ Toolkit, available from the Globus™ Alliance. Specifically, the Globus™ Toolkit security components, collectively referred to as the Grid Security Infrastructure (GSI), facilitate secure communications (e.g., between storage grid agents and the redirection module) and the application of uniform policies across distinct systems. The Globus™ Toolkit Data Management components provide for the discovery, transfer and access of large amounts of data (e.g., between a backup application and a storage node). The Globus™ Toolkit Execution Management components deal with the deployment, scheduling and monitoring of executable programs (e.g., such as the scheduling of backups). The Globus™ Toolkit Information Services, commonly referred to as the Monitoring and Discovery Systems (MDS), include components to monitor and discover resources in a virtual organization (e.g., such as components to monitor the amount of space available on a storage device).

Figure 4:
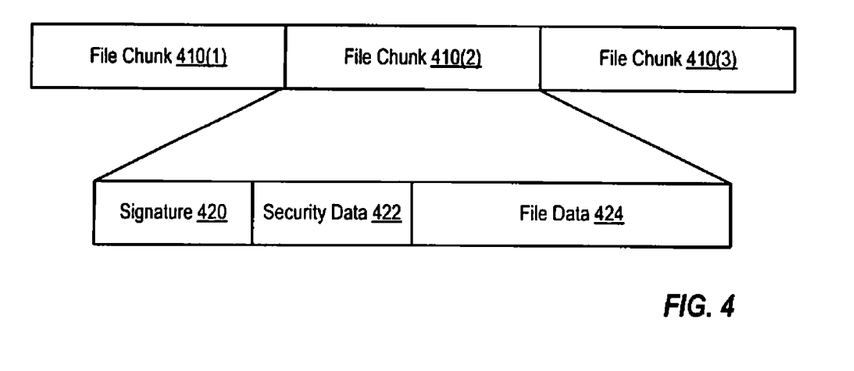
FIG. 4 is a block diagram of data that is being transferred as part of a backup operation, according to one embodiment of the present invention.

In the storage grid of FIG. 4, each storage grid agent 310 (1)-310(3) provides an interface to a backup application that is much the same as the interface provided by one of the media servers of FIG. 1. In particular, each storage grid agent can provide a standard Application Programming Interface (API) to a backup application for information storage and access. This interface acts to abstract the details of the storage grid away from the backup applications. In other words, the backup application can write information to the storage grid in the same manner that the backup application would write information to a storage medium provided by a media server, despite the fact that the actual information written to the storage grid may be distributed among multiple heterogeneous nodes (each node is a computing device that provides storage to the storage grid).

In response to receiving a request to perform a backup from a respective backup application, a storage grid agent is configured to submit the request to redirection module 120. Redirection module 120 will select a node and schedule the backup. At the scheduled time, a connection is established between the backup application and the selected node (via the storage grid agent coupled to the backup application), allowing the backup application to write backup information to the storage media included in the selected node.

After the connection is established and the backup begins, redirection module 120 monitors the status of the storage media being written to by the backup application. For example, if a connection has been established between backup application 105 (1) and the node that includes storage media 150(1) via storage grid agent 310(1), redirection module 120 can monitor the status of storage media 150(1). Monitoring the status can involve monitoring the amount of space available in storage media 150(1), connection efficiency, and the like.

In some embodiments, redirection module 120 monitors storage media provided by a node by communicating with a node-specific monitoring module executing on that particular node. For example, a node-specific monitoring module executing on computing device 100(4) can monitor the amount of space available on storage media 150(1) and communicate information indicative of the results of the monitoring to redirection module 120. If an imminent storage overflow is detected (e.g., due to the amount of space available on storage media 150(1) being less than a threshold amount) during an ongoing backup operation, the node-specific monitoring module can send information indicative of that imminent storage overflow to redirection module 120.

If the amount of space remaining on storage media 150(1) drops below a threshold amount after a portion (backup info 125(1)) of the backup information has been written to storage media 150(I) and before the backup has completed, redirection module 120 can send storage grid agent 310(1) a request to pause the backup. Alternatively, this pause request can be generated and sent to storage grid agent 310(1) by a node-specific monitoring module executing on computing device 100(4).

Redirection module 120 can then select another node (e.g., the node containing storage media 150(2) in this example) and establish a connection between that node and backup application 105 (1). Redirection module 120 can then communicate with storage grid agent 310(1) to resume the paused backup operation. The backup can then write the remaining backup information, backup info 125(2), to storage media 150(2). Redirection module 120 can also generate metadata identifying that the backup information, backup info 125(1) and 125(2), generated by the backup is distributed among storage media 150(1) and 150(2).

In the illustrated embodiment, the storage grid includes a centralized job manager (e.g., redirection module 120). It is noted that other embodiments may include decentralized job management functionality, such that multiple modules can schedule and redirect ongoing backups at the same time.

It is further noted that FIG. 3 provides just one example of a distributed computing architecture. It is noted that other distributed computing environments (e.g., peer-to-peer computing environments) can also employ the redirection techniques described herein. Such distributed computing environments can employ a centralized redirection module (e.g., as shown in the grid storage environment of FIG. 3) or a distributed redirection module. For example, in one such embodiment, each node in the distributed computing environment can include a redirection module. In such an embodiment, an individual storage node that is selected as the initial target of a backup can be configured to redirect the ongoing backup to a second node. In such a situation, the second connection, which is established between the backup application and the second node, can include the initial node from which the backup is being redirected.

FIG. 3 shows a simplified scenario in which separate computing devices provide storage and implement backup applications. In actual implementations, a given computing device is likely to both implement a backup application and provide storage that can be used to store backups. For example, storage provided by computing device 100(1) can be used to store backup information generated by any of backup applications 105(1)-105(3).

In some embodiments, the storage grid of FIG. 3 is configured to replicate some or all of the backup information generated by the backup applications. For example, in order to provide increased availability and/or increased read performance, the storage grid can be configured to replicate each set of backed up information stored by storage media 150(1) onto an independent storage medium.

It is noted that not all of the capacity within the storage grid is necessarily used to store backup information. For example, in the illustrated embodiment, storage media 150(3) is not currently used to store any backup information. This available capacity can be used by other applications (i.e., non-backup applications) or by future backups.

FIG. 4 is a block diagram that provides an example of backup information that can be transferred as part of a backup operation. In this example, the total backup information generated by a backup operation includes several file "chunks" 410(1), 410(2), and 410(3). The major part of each file chunk is raw file data 424. Additionally, each file chunk can also include a signature 420 and/or security data 422. Security data 422 can indicate the ownership of the files included in file data 424. It is noted that some embodiments may omit security data 422 and/or signature 420 from the backup information (e.g., if those embodiments do not support certain security features and/or single instance storage).

Signature 420 can be a checksum or other signature that is generated based upon the actual value of file data 424. In one embodiment, signature 420 is used to implement single instance storage. For example, as backup information is written to the storage grid, a redirection module 120 and/or one of storage grid agents 310(1)-310(3) of FIG. 3 can compare each file chunk's signature with a set of signatures that represent file chunks already stored by the storage grid. If the file chunk's signature matches the signature of an already-stored file chunk, the redirection module and/or storage grid agent can prevent the file chunk from being written as part of the backup. Instead, the redirection module and/or storage grid agent can generate metadata indicating the storage location that already stores a copy of that file chunk. Alternatively, other techniques (e.g., such as a bit-by-bit comparison of some or all of each file chunk to already-stored file chunks) can be used to implement single instance storage, instead of and/or in addition to comparing the signatures of file chunks.

In one embodiment, each storage grid agent of FIG. 3 is configured to generate new signatures for file chunks being written as part of a backup, insert the signatures into the backup stream, compare the new signatures to signatures of file chunks already stored by the storage grid, and (at least occasionally) broadcast newly generated signatures to other storage grid agents.

FIG. 5 is a block diagram of a redirection module for managing backup-related operations in a grid storage system. It is noted that many embodiments of a redirection module can include fewer components (e.g., embodiments that are not used in grid computing systems will not need to include many of the job management components).

As shown, redirection module 120 of FIG. 5 includes a job management module 500 and a catalog 520. Job management module 500 includes a job request receiver 550, a queue 555, a scheduler 560, a dispatcher 565, a monitor 570, a resource information listener 575, system status information 580, and a running queue 585.

Job request receiver 550 is configured to receive job requests (e.g., requests to perform backups or restores or information indicating that an ongoing backup should be redirected) from storage grid agents and/or monitor 570. Job request receiver 550 can store job requests that are not able to be scheduled immediately in queue 555. High priority job requests (e.g., requests to redirect an ongoing backup) can be added to the front or beginning of the queue and low priority job requests (e.g., requests to perform a backup or restore) can be added to the back or end of the queue. In some embodiments, queue 555 is subdivided into multiple queues (e.g., a high priority queue and a low priority queue).

Scheduler 560 selects job requests from the beginning of queue 555 for scheduling. In some embodiments, scheduler 560 is configured to wait to select new jobs from queue 555 whenever there are no jobs in the queue and/or whenever all nodes are currently involved in ongoing backup requests. If scheduler 560 is in a waiting mode and job request receiver 550 receives a request to redirect an ongoing backup (e.g., such a request can be indicated if information indicating an imminent storage overflow is received from a storage node by resource information listener 575), job request receiver 550 can communicate with scheduler 560 directly in order to cause scheduler 560 to exit the waiting mode.

System status information 580 includes information corresponding to each storage node currently in the storage grid. For each storage node, system status information 580 indicates a disk quota, a data rate, and/or the round trip time to communicate with all other storage nodes and all storage grid agents.

Resource information listener 575 is configured to update system status information 580 based upon information received from each storage node. In one embodiment, resource information listener 575 subscribes to a resource monitor service that provides updated status information from individual storage nodes each time there is a change in that status information.

Scheduler 560 decides when to schedule the job requests in queue 555. Scheduler 560 bases its scheduling decisions on the current workload of each individual storage node, the network conditions, and the requests in queue 555. In one embodiment, each individual storage node has a specific resource limit, which is specified at the beginning when the node joins the storage grid. If a storage node's current resource utilization is already beyond that storage node's resource limit, then that storage node is not available to handle new backup jobs. The whole storage grid is unavailable if all of the storage nodes are unavailable.

Dispatcher 565 decides which storage node(s) should actually be used to handle a scheduled job request, based on the job specification and the current system workload. Once dispatcher 565 selects a storage node (or nodes), the job request and information identifying the selected storage node (or nodes) are forwarded to monitor 570. For example, if the job request is a redirection request or a backup request, dispatcher 565 can select a single storage node. If instead the job request is a request to restore a volume from a backup, and if the specified backup was redirected, dispatcher 565 can select each storage node that stores a portion of the backup information generated by that backup. Similarly, if a restore from a particular backup is specified and single instance storage is being implemented, dispatcher 565 can select each storage node that stores a file chunk included in the backup information generated by that particular backup.

In one embodiment, when selecting a node to which an ongoing backup should be redirected, dispatcher 565 uses the following formula to calculate a score for each candidate storage node, and then selects the storage node with the highest score. The formula takes into account the difference between the disk quota of each candidate storage node and the length of the backup job so far (in terms of amount of storage consumed by the backup, so far). If a given storage node's disk quota is smaller than the length of the job so far, that storage node will receive a negative score, which in turn makes it very unlikely that the storage node will be selected.

In the formula, LJ=length of the redirected backup job so far, DQ is the disk quota on the candidate storage node, DR is the current data rate of the candidate storage node, DRL is the data rate limit of the candidate storage node, RTTAN is the round trip time between the storage grid agent involved in the backup and the candidate storage node, NWJ is the number of waiting jobs that have been assigned to the candidate storage node but not yet executed, and NRJ is the number of running jobs that are currently executing on the candidate storage node. Thus, the formula takes into account the amount of resources (e.g., current and future processing usage, disk space, and the like) available on the candidate storage node.

$$score = \frac{\left(DRL - DR * \frac{NWJ + NRJ}{NRJ}\right) * (DQ - LJ)}{RTTAN}$$

Monitor 570 executes and monitors all of the running jobs in the storage grid. Upon receiving a job request from dispatcher 565, monitor 570 communicates with the appropriate storage grid agent in order to cause the requested job to be performed on the selected storage node. The monitor adds all running jobs to running queue 585 and monitors (e.g., by receiving information generated by a node-specific monitoring module on a storage node) the ongoing jobs.

Running queue 585 stores information identifying all jobs that are already scheduled but have not yet finished. Running queue 585 is mainly maintained by monitor 570. Entries in running queue 585 include a job identifier that uniquely identifies a job, a job start time (e.g., indicating the time at which the job was requested by a storage grid agent or other initiator and/or executed by monitor 570), a job type (e.g., indicating whether the job is a backup, restore, or redirection), a job source (e.g., identifying the backup application that initiated the job and/or the storage media storing the source information that will be copied by the job), and a job destination (e.g., identifying the storage media that acts as the destination to which information will be written by the job).

When a job completes (e.g., as detected by monitor 570) or is redirected, monitor 570 can update catalog 520. Catalog 520 contains information (e.g., metadata) about the physical location (i.e., storage node(s)) of a backup, file chunk, or other logical set of information. Catalog 520 permits dispatcher 565 to map between logical sets of information and the corresponding physical storage nodes (e.g., when selecting storage nodes to act as sources for a restore job). Catalog 520 can be stored on a storage device that is part of and/or accessible to the computing device that implements redirection module 120.

While the example of FIG. 5 shows a centralized catalog that provides a centralized repository for the metadata describing the location of each portion of each backup, other embodiments can be implemented differently. For example, in one alternative embodiment, the metadata can be distributed throughout the grid computing system.

Figure 6:
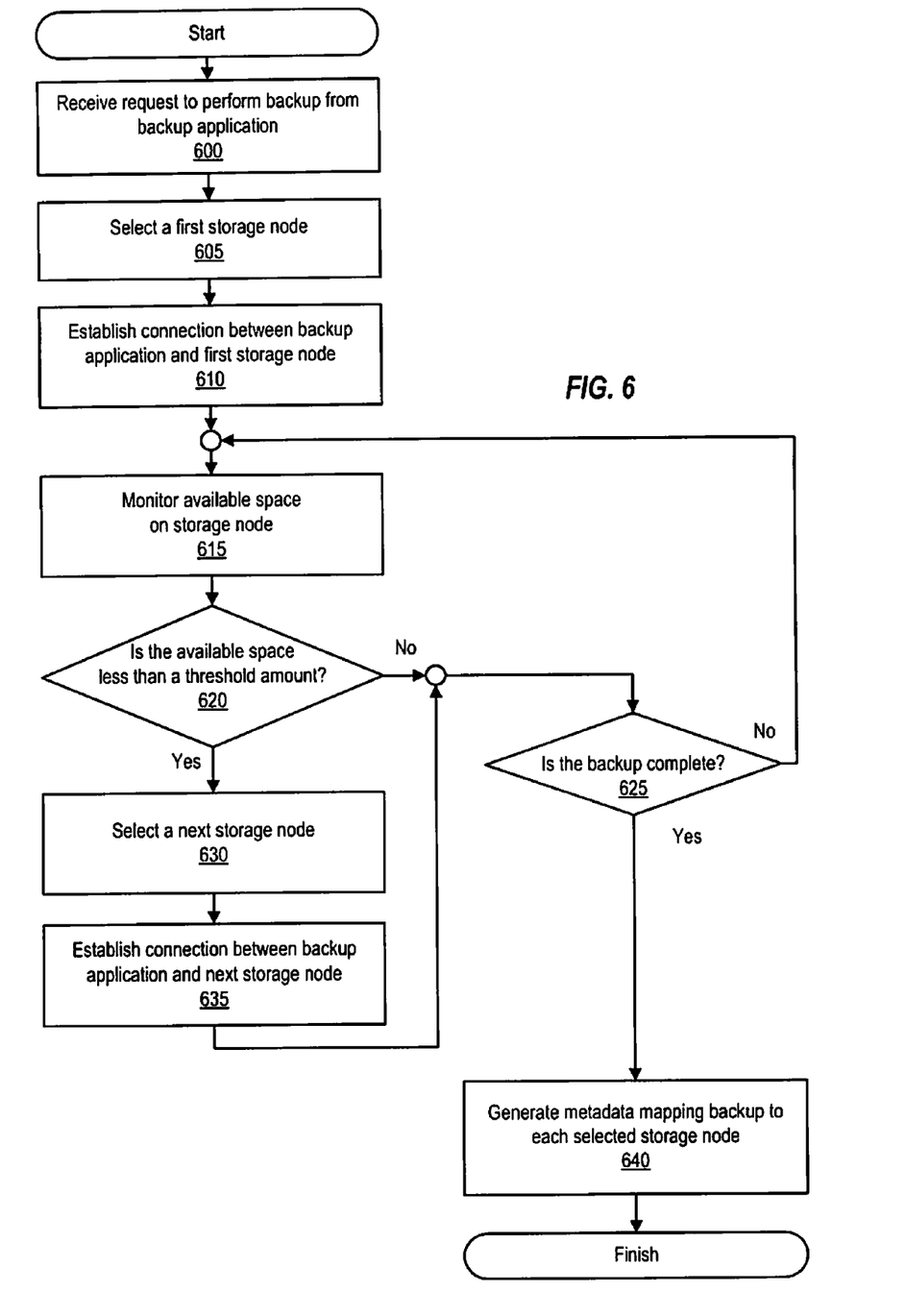
FIG. 6 is a flowchart of a method of redirecting an in-process backup operation in a storage grid, according to one embodiment of the present invention.

FIG. 6 is a flowchart of a method of redirecting an in-process backup operation in a storage grid. The method begins at 600, when a request to perform a backup is received from a backup application. Receiving a request to perform a backup can involve receiving (e.g., via a network and/or storage grid agent) a request to begin copying information to be backed up to a storage grid. Operation 600 can be performed by an a storage grid agent configured to provide an interface to a storage grid and/or a job management module configured to schedule jobs within a storage grid.

At 605, a first storage node is selected. The first storage node can be selected by a redirection module. In particular, a dispatcher within a job management module of a redirection module can select the first storage node. Selection of the first storage node can be dependent upon the amount of space available on the first storage node as well as other considerations (e.g., the number of jobs running on and/or waiting to run on that storage node, the data rate and/or data rate limit of that storage node, and the like).

At 610, a connection is established between the backup application and a first storage node. Establishing the connection can involve facilitating the writing of information, which is a copy of the information being backed up by the backup, to the first storage node. Operation 610 can be performed by a storage grid agent.

At 615, the amount of space available on the first storage device is monitored. Monitoring the amount of space available can involve repeatedly (e.g., at prespecified intervals) or continuously ascertaining the amount of free (i.e., unutilized) space remains on the first storage device. Operation 615 can be performed by a redirection module and/or a node-specific monitoring module within the storage node itself (e.g., the node can signal the redirection module if certain conditions involving the amount of available space arise).

At 620, a determination is made as to whether the available space on the first storage device is less than a threshold amount. Operations 615 and 620 can be repeated until the backup completes, as indicated at 625.

If the available space monitored at 615 is less than a threshold amount, the backup is redirected. Redirecting the backup involves selecting a next storage node, as shown at 630, and then establishing a connection between the backup application and the next storage node, as shown at 635. Operation 630 can be performed by a redirection module (e.g., a dispatcher within a job management module in the redirection module can perform this operation), and operation 635 can be performed by a storage grid agent.

In some embodiments, the second connection can include the first direction. For example, when a backup is redirected from a first storage node to a second storage node, the redirection can be effected by establishing a new connection between the first storage node and the second storage node, such that backup information generated by the backup application can now be written to the second storage node via a second connection that includes the original first connection with the first storage node and the new connection between the first storage node and the second storage node.

To avoid any loss of information, the backup may be paused as soon as the amount of space available on the first storage node is determined to be less than the threshold amount. The backup can resume (i.e., pausing of the backup can cease) as soon as the connection with the next storage node is established.

Upon completion of the backup, metadata mapping the backup information generated by the backup to each storage node selected to store the backup information (e.g., by operations 605 and 630) is generated, as shown at 640. This metadata can be generated by one or more monitors within a job management module of a redirection module and stored in a catalog.

In the embodiment of FIG. 6, second and subsequent connections are established in response to detection of a situation requiring redirection. In alternative embodiments, instead of waiting until a situation requiring redirection arises to establish a connection with a second or subsequent storage node, the redirection module (or another system component) can establish connections with all of the nodes that can potentially store backup information, at the time that the backup request is detected (or at some other time prior to detecting the need to redirect the backup). For example, such connections can be established by configuring all nodes that can potentially store backup information for a given backup to receive network traffic addressed to a particular multicast address, and then causing the backup information generated as part of the backup to be sent to this multicast address. Alternatively, the backup information can be sent to a broadcast address that all nodes listen to.

The redirection module can then select one of the nodes that is listening to the multicast address to initially store the backup information and send the selected node a message or other signal informing that node that the receiving node should store the backup information received via the multicast connection. The other nodes will receive but not store the backup information being sent via the multicast connection. If the backup needs to be redirected, the redirection module can effect the redirection by sending a message causing the first selected node to stop storing the information received via the multicast connection and causing another node that is already listening to the multicast address to begin storing the information. Thus, the connections between the nodes and the backup application are established before any redirection occurs; however, only one of the nodes will actually be storing the backup data being sent via those connections at any time. The nodes that are not currently storing the backup information can drop or otherwise discard any backup information received via the multicast connection. It is noted that this multicasting technique for establishing connections can also be used in other environments, in addition to being used in environments like those shown in FIGS. 1 and 3.

Figure 7:
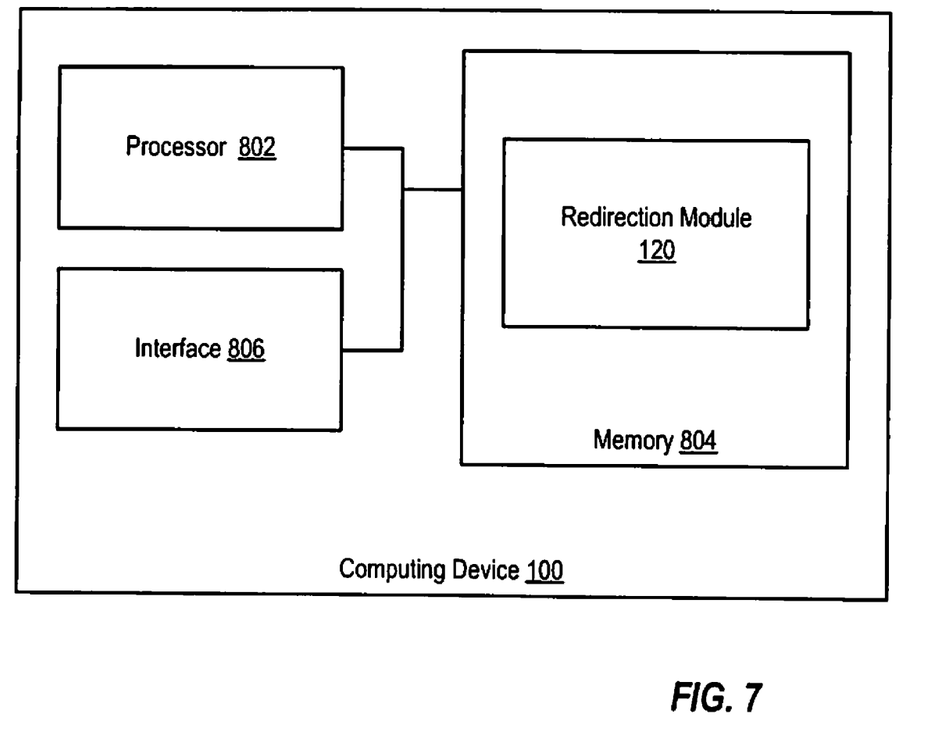
FIG. 7 is a block diagram of a computer system that illustrates how a redirection module can be implemented in software, according to one embodiment of the present invention.

FIG. 7 is a block diagram of a computer system that illustrates how a redirection module can be implemented in software. FIG. 7 is a block diagram of a computing device 100 (e.g., one of computing devices 100(1)-100(3) of FIG. 1 and/or one of computing devices 100(1)-100(6) of FIG. 3) that implements a redirection module 120.

Computing device 100 can be a personal computer, network appliance, server, personal digital assistant, mobile phone, storage controller (e.g., an array controller, tape drive controller, or hard drive controller), or the like. As illustrated, computing device 100 includes one or more processors 802 (e.g., microprocessors, Programmable Logic Devices (PLDs), or Application Specific Integrated Circuits (ASICs)) configured to execute program instructions stored in memory 804. Memory 804 can include various types of RAM (Random Access Memory), Read Only Memory (ROM), Flash memory, Micro Electro-Mechanical Systems (MEMS) memory, magnetic core memory, and the like. Memory 804 can include both volatile and non-volatile memory. Computing device 100 also includes one or more interfaces 806. Processor 802, interface 806, and memory 804 are coupled to send and receive data and control signals by a bus or other interconnect.

Interface 806 can include a network interface to various networks and/or interfaces to various peripheral buses. For example, interface 806 can include a network interface via which redirection module 120 receives backup requests from backup applications and/or storage grid agents. Redirection module 120 can also send requests to pause backups and to redirect backups via interface 806. Interface 606 can also include an interface to one or more storage devices. For example, redirection module 120 can write new metadata to a catalog via interface 806.

In this example, program instructions and data executable to implement all or part of redirection module 120 are stored in memory 804. The program instructions and data implementing redirection module 120 can be stored on various computer readable storage media such as memory 804. In some embodiments, such software is stored on a computer readable medium such as a Compact Disc (CD), Digital Versatile Disc (DVD), hard disk, optical disk, tape device, floppy disk, and the like). In order to be executed by processor 802, the instructions and data can be loaded into memory 804 from the other computer readable storage medium. The instructions and/or data can also be transferred to computing device 100 for storage in memory 804 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a request to perform a backup from a backup application;
causing backup information generated by the backup application to be stored on a first storage device, in response to reception of the request;
detecting that an amount of space available on the first storage device is less than a threshold amount, wherein the detecting is performed subsequent to causing the backup information to be stored on the first storage device and prior to completion of the backup;
in response to the detecting, causing subsequent backup information generated by the backup application to be stored on a second storage device, wherein the subsequent backup information is stored on the second storage device prior to completion of the backup; and
generating metadata associated with the backup, wherein the metadata identifies that the backup information stored on the first storage device and the subsequent backup information stored on the second storage device are associated with the backup.

2. The method of claim 1, wherein the detecting is performed by a first media server coupled to the first storage device.

3. The method of claim 1, wherein the first storage device and the second storage device are included in a storage grid.

4. The method of claim 1, further comprising:
selecting the second storage device from a plurality of storage devices.

5. The method of claim 4, wherein the selecting is based, at least in part, upon an amount of resources available on a node, wherein the node comprises the second storage device.

6. The method of claim 1, further comprising:
detecting that an amount of space available on the second storage device is less than a threshold amount, wherein the detecting is performed subsequent to causing the subsequent backup information to be stored on the second storage device and prior to completion of the backup;
in response to the detecting, causing additional backup information generated by the backup application to be stored on an additional storage device, wherein the subsequent backup information is stored on the additional storage device prior to completion of the backup.

7. The method of claim 1, further comprising:
comparing a first signature of a file chunk being written to the first storage device via the first connection to a second signature of a file chunk already stored by a storage grid; and allowing the file chunk to be written to the first storage device only if the first signature does not equal the second signature.

8. The method of claim 1, further comprising:
pausing the backup while the backup is being redirected from the first storage device to the second storage device.

9. The method of claim 1, wherein a first node comprising the first storage device and a second node comprising the second storage device are each configured to receive traffic sent to a multicast address, wherein the first node and the second node are initially configured to drop traffic sent to the multicast address, and wherein the causing the backup information to be stored on the first storage device comprises sending the first node a message indicating that the first node should begin storing information sent to the multicast address.

10. A system comprising:
a metadata storage device; and
a redirection module coupled to the metadata storage device, wherein the redirection module is configured to:
detect a request for a backup application to perform a backup;
cause backup information generated by the backup application to be stored on a first storage device, in response to detection of the request;
receive an indication that an amount of space available on the first storage device is less than a threshold amount, subsequent to causing the backup information to be stored on the first storage device and prior to completion of the backup;
cause subsequent backup information to be stored on a second storage device in response to the indication, wherein the subsequent backup information is stored on the second storage device prior to completion of the backup; and
write at least a portion of metadata associated with the backup to the metadata storage device, wherein the metadata identifies that information associated with the backup is stored on both the first storage device and the second storage device.

11. The system of claim 10, wherein a first media server comprises the redirection module, wherein the redirection module is configured to cause the subsequent backup information to be stored on the second storage device by communicating with a second redirection module, and wherein a second media server comprises the second redirection module.

12. The system of claim 10, wherein the first storage device and the second storage device are included in a storage grid.

13. The system of claim 10, wherein the redirection module is further configured to select the second storage device from a plurality of storage devices.

14. The system of claim 10, wherein the redirection module is further configured to pause the backup while the backup is being redirected from the first storage device to the second storage device.

15. A computer readable storage medium comprising program instructions executable to:
detect a request for a backup application to perform a backup;
cause backup information generated by the backup application to be stored on a first storage device, in response to detection of the request;
receive an indication that an amount of space available on the first storage device is less than a threshold amount, subsequent to causing the backup information generated by the backup application to be stored on the first storage device and prior to completion of the backup;
cause subsequent backup information generated by the backup application to be stored on a second storage device in response to the indication, wherein the subsequent backup information is stored on the second storage device prior to completion of the backup; and
generate at least a portion of metadata associated with the backup, wherein the metadata identifies that information associated with the backup is stored on both the first storage device and the second storage device.

16. The computer readable medium of claim 15, wherein the indication is received by a first media server, and wherein the program instructions are executable to cause the subsequent backup information to be stored on the second storage device by communicating with a second media server.

17. The computer readable medium of claim 15, wherein the first storage device and the second storage device are included in a storage grid.

18. The computer readable medium of claim 15, wherein the program instructions are further executable to select the second storage device from a plurality of storage devices.

19. The computer readable medium of claim 15, wherein the program instructions are further executable to pause the backup while the backup is being redirected from the first storage device to the second storage device.

20. A system comprising:
means for detecting a request for a backup application to perform a backup;
means for causing backup information generated by the backup application to be stored on a first storage device, in response to detection of the request;
means for receiving an indication that an amount of space available on the first storage device is less than a threshold amount, subsequent to causing the backup information to be stored on the first storage device and prior to completion of the backup;
means for causing subsequent backup information generated by the backup application to be stored on a second storage device in response to the indication, wherein the subsequent backup information is stored on the second storage device prior to completion of the backup;
means for generating at least a portion of metadata associated with the backup, wherein the metadata identifies that information associated with the backup is stored on both the first storage device and the second storage device; and
means for storing the metadata.

* * * * *